(12) United States Patent
Matsuzaki et al.

(10) Patent No.: US 11,629,734 B2
(45) Date of Patent: Apr. 18, 2023

(54) COMPRESSOR DEVICE WITH TURBINE SECTION WATER RECIRCULATION PATH

(71) Applicant: Garrett Transportation I Inc., Torrance, CA (US)

(72) Inventors: Ryoken Matsuzaki, Torrance, CA (US); Junichi Masuda, Torrance, CA (US); Jeffrey Lotterman, Los Angeles, CA (US); Marika Nick Alexakis, Redondo, CA (US)

(73) Assignee: GARRETT TRANSPORTATION I INC., Torrance, CA (US)

( * ) Notice: Subject to any disclaimer, the term of this patent is extended or adjusted under 35 U.S.C. 154(b) by 313 days.

(21) Appl. No.: 16/889,967

(22) Filed: Jun. 2, 2020

(65) Prior Publication Data

US 2021/0372435 A1 Dec. 2, 2021

(51) Int. Cl.
| | |
|---|---|
| *F04D 29/68* | (2006.01) |
| *F04D 29/42* | (2006.01) |
| *H01M 8/04111* | (2016.01) |
| *F01D 9/04* | (2006.01) |
| *F01D 11/08* | (2006.01) |

(Continued)

(52) U.S. Cl.
CPC ....... *F04D 29/685* (2013.01); *F04D 29/4213* (2013.01); *H01M 8/04111* (2013.01); *F01D 9/041* (2013.01); *F01D 11/08* (2013.01); *F04D 25/045* (2013.01); *F04D 29/056* (2013.01); *F04D 29/284* (2013.01);

(Continued)

(58) Field of Classification Search
CPC .... F04D 29/685; F04D 29/4213; F04D 27/02; F05D 2250/51; F05D 2250/191; F05D 2250/294; F05D 2260/607; F05D 2260/608; F05D 2260/6022; F05D 2270/101; H01M 8/041; F01D 9/045; F01D 25/32

See application file for complete search history.

(56) References Cited

U.S. PATENT DOCUMENTS

| 3,944,380 A * | 3/1976 | Kampe | F01D 25/32 |
|---|---|---|---|
| | | | 415/121.2 |
| 7,367,189 B2 * | 5/2008 | Ishiwatari | F02D 41/221 |
| | | | 60/609 |

(Continued)

FOREIGN PATENT DOCUMENTS

DE 3724385 C2 5/1993

*Primary Examiner* — Michael Lebentritt
*Assistant Examiner* — Danielle M. Christensen
(74) *Attorney, Agent, or Firm* — Lorenz & Kopf, LLP

(57) ABSTRACT

A turbine section of a turbomachine includes a housing that houses and supports the rotating group for rotation about an axis. The housing defines a circumferential inlet passage that extends about the axis. The housing defines a turbine wheel upstream area that is disposed downstream of the circumferential inlet passage and upstream of the turbine wheel. The housing defines an outlet that is downstream of the turbine wheel. Furthermore, the turbine section includes a first flow path that extends from the circumferential inlet passage, through the turbine wheel upstream area, across the turbine wheel, to the outlet. Moreover, the turbine section includes a recirculation flow path that extends from the circumferential inlet passage, through the turbine wheel upstream area, and back to the circumferential inlet passage.

20 Claims, 4 Drawing Sheets

(51) Int. Cl.
*F04D 25/04* (2006.01)
*F04D 29/056* (2006.01)
*F04D 29/28* (2006.01)

(52) U.S. Cl.
CPC ...... *F05D 2220/40* (2013.01); *F05D 2250/51* (2013.01); *F05D 2270/101* (2013.01)

(56) References Cited

U.S. PATENT DOCUMENTS

| | | | |
|---|---|---|---|
| 9,797,409 B2 * | 10/2017 | Bucking | F01D 25/186 |
| 10,135,080 B2 | 11/2018 | Estorf et al. | |
| 11,377,979 B2 * | 7/2022 | Ikeya | F01D 25/16 |
| 2017/0051761 A1 * | 2/2017 | Pruitt | F02B 37/16 |

* cited by examiner

COMPRESSOR DEVICE WITH TURBINE SECTION WATER RECIRCULATION PATH

TECHNICAL FIELD

The present disclosure generally relates to a turbine section of a turbomachine and, more particularly, to a compressor device with a turbine section water recirculation path.

BACKGROUND

Fuel cell systems and other machinery often include a charging device. In the case of a fuel system, a fuel cell compressor device may be included for compressing air before it is fed to the fuel cell stack. This can increase operating efficiency of the fuel cell system.

However, conventional fuel cell compressor devices suffer from various deficiencies. For example, some fuel cell compressor devices include a turbine section that ingests liquid water exhausted from the fuel cell stack. The liquid water can inhibit operation of the turbine section, cause rotational surging, overload the bearing, and/or otherwise negatively affect the compressor device.

It is therefore desirable to provide a fuel cell compressor device with improved water ingestion capability. Other desirable features and characteristics of the present disclosure will become apparent from the subsequent detailed description and the appended claims, taken in conjunction with the accompanying drawings and this background discussion.

BRIEF SUMMARY

In one embodiment, a turbine section of a turbomachine is disclosed that includes a rotating group with a turbine wheel. The turbine section includes a housing that houses and supports the rotating group for rotation about an axis. The housing defines a circumferential inlet passage that extends about the axis. The housing defines a turbine wheel upstream area that is disposed downstream of the circumferential inlet passage and upstream of the turbine wheel. The housing defines an outlet that is downstream of the turbine wheel. Furthermore, the turbine section includes a first flow path that extends from the circumferential inlet passage, through the turbine wheel upstream area, across the turbine wheel, to the outlet. Moreover, the turbine section includes a recirculation flow path that extends from the circumferential inlet passage, through the turbine wheel upstream area, and back to the circumferential inlet passage.

In another embodiment, a method of manufacturing a turbine section of a turbomachine is disclosed. The method includes housing a turbine wheel of a rotating group within a housing and supporting the rotating group within the housing for rotation about an axis. The method further includes mating a first structure of the housing with a second structure of the housing member. The housing defines a circumferential inlet passage that extends about the axis. The housing also defines a turbine wheel upstream area that is disposed downstream of the circumferential inlet passage and upstream of the turbine wheel. The housing further defines a first flow path, a recirculation flow path, and an outlet that is downstream of the turbine wheel. The first flow path extends from the circumferential inlet passage, through the turbine wheel upstream area, across the turbine wheel, to the outlet. The recirculation flow path extends from the circumferential inlet passage, through the turbine wheel upstream area, and back to the circumferential inlet passage.

In an additional embodiment, a compressor device for a fuel cell system is disclosed. The compressor device includes a rotating group and a housing that houses and supports the rotating group for rotation about an axis to define a compressor section, a motor section, and a turbine section. The turbine section includes a turbine wheel of the rotating group. The turbine wheel is configured to be driven in rotation by an exhaust stream from the fuel cell system. The housing at the turbine section includes a circumferential inlet passage that extends about the axis. The housing at the turbine section also defines a turbine wheel upstream area that is disposed downstream of the circumferential inlet passage and upstream of the turbine wheel. The housing at the turbine section defines an outlet that is downstream of the turbine wheel. Moreover, the compressor device includes a first flow path that extends from the circumferential inlet passage, through the turbine wheel upstream area, across the turbine wheel, to the outlet. Additionally, the compressor device includes a recirculation flow path that extends from the circumferential inlet passage, through the turbine wheel upstream area, and back to the circumferential inlet passage.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a turbine section (i.e., turbine stage) of a turbomachine that provides certain operational benefits thereto. In some embodiments, the housing at the turbine section defines a circumferential flow passage (e.g., a toroidal passage, a volute passage, etc.) and an outlet. The turbine section may also include a turbine wheel that is disposed between the circumferential flow passage and the outlet along a first flow path for at least one fluid. The housing may also define a recirculation flow path that allows recirculation of at least one fluid. The recirculation flow path may include a recirculation flow channel that fluidly connects a turbine wheel upstream area of the first flow path back to the circumferential inlet passage. Accordingly, a fluid (e.g., liquid water) within the turbine wheel upstream area may recirculate back into the circumferential inlet passage instead of continuing along the first flow path and across the turbine wheel. Thus, rotation of the turbine wheel is less likely to be affected by this fluid. When used in a fuel cell system, for example, the turbine section/stage of the present disclosure has improved water ingestion capability.

Figure 1:
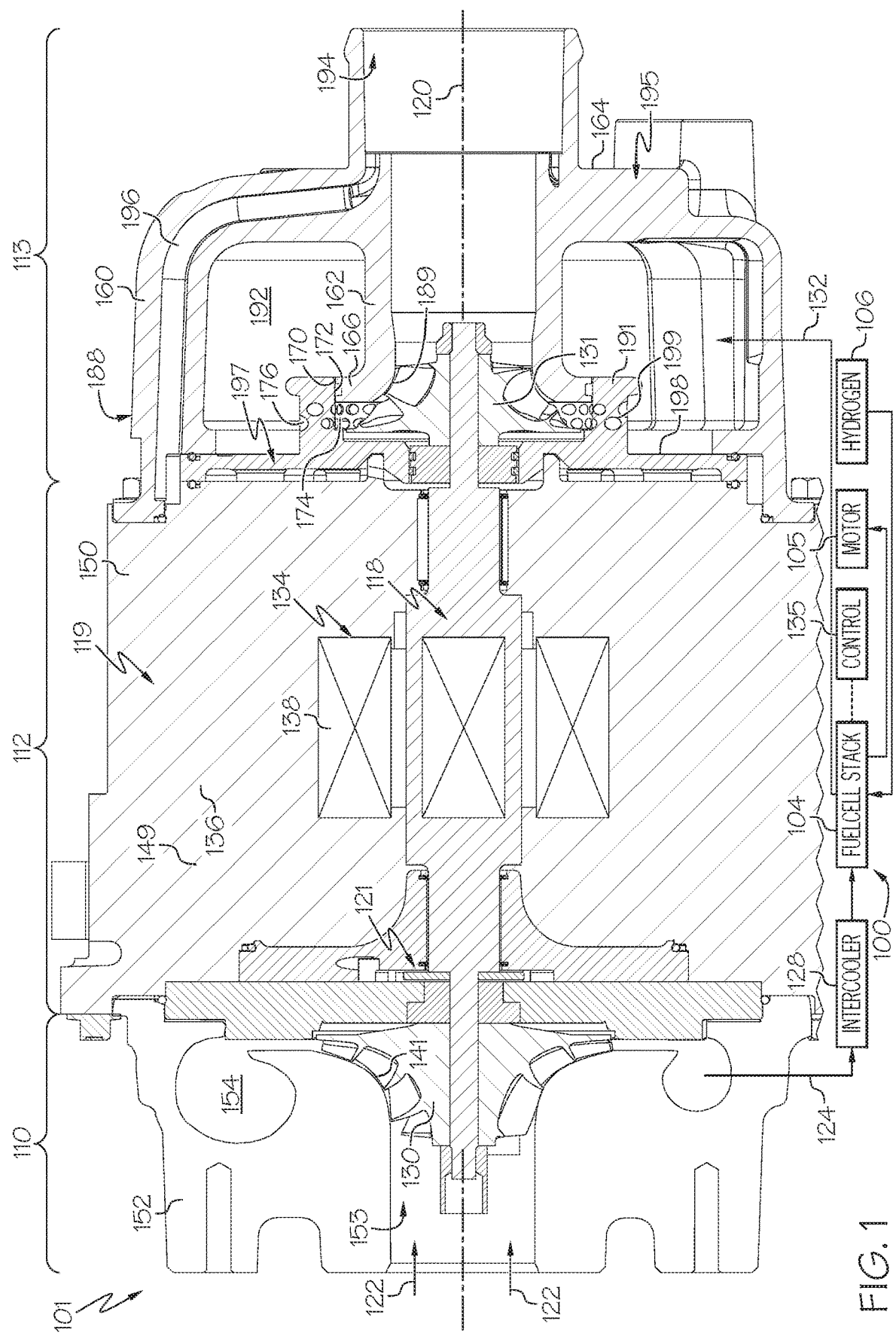
FIG. 1 is a schematic diagram of a fuel cell system with a cross-sectional view of a turbomachine according to example embodiments of the present disclosure.

Referring initially to FIG. 1, a turbomachine 101 is shown according to example embodiments. As shown, the turbomachine 101 generally includes a housing 119 (shown schematically) and a rotating group 118 supported for rotation within the housing 119 about an axis of rotation 120 by one or more bearings 121. In some embodiments, the rotating group 118 and the housing 119 may cooperatively define a compressor section 110 (i.e., compressor stage) and a turbine section 113 (i.e., turbine stage). Also, a motor section 112 may be disposed axially between the compressor and turbine sections 110, 113.

The rotating group 118 may generally include a shaft 149 that extends axially through the compressor section 110, the turbine section 113, and the motor section 112. The rotating group 118 may also include a compressor wheel 130 and a turbine wheel 131, which are attached on opposite ends of the shaft 149.

The bearing 121 of the turbomachine 101 supports the rotating group 118 for rotation within the housing 119. The bearing 121 may have various configurations without departing from the scope of the present disclosure. In the illustrated embodiment, the bearing 121 is an air bearing. However, it will be appreciated that the bearing 121 may include roller elements or may be configured otherwise. The bearing may 121 also include an oil-fed journal bearing of various architectures (e.g., fully floating, semi-floating, split, coupled, etc.). Moreover, the bearing 121 may include an oil-fed rolling element bearing in some embodiments.

The turbomachine 101 may be operatively connected to a fuel cell system 100 and may be configured as an e-charger or electric motorized compressor device for the fuel cell system 100. The fuel cell system 100 may include a fuel cell stack 104 containing a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an electrical device, such as an electric motor 105. In some embodiments, the fuel cell system 100 may be included in a vehicle, such as a car, truck, sport utility vehicle, van, motorcycle, etc. Therefore, in some embodiments, the electric motor 105 may convert the electrical power to mechanical power to drive and rotate an axle (and, thus, one or more wheels) of the vehicle.

Oxygen may be provided to the fuel cell stack 104, at least in part, by the turbomachine 101. More specifically, the motor section 112 may drive rotation of the rotating group 118, the compressor section 110 may provide a compressed air stream (represented by arrow 124) to an intercooler 128 as it flows to the stack 104, and an exhaust gas stream 132 from the stack 104 may be fed back to the turbine section 113, which in turn provides mechanical power assist to the motor section 112.

Various components of the fuel cell system 100 and/or the turbomachine 101 may be controlled by a control system 135. The control system 135 may be a computerized system with a processor, various sensors, and other components for electrically controlling these operations. In some embodiments, the control system 135 may define or may be part of the electrical control unit (ECU) of a vehicle.

It will be appreciated, however, that other configurations of the turbomachine 101 fall within the scope of the present disclosure. For example, the turbomachine 101 of the present disclosure may be provided in other systems (i.e., other than fuel cell systems). Moreover, features of the turbine section 113 may be included in a turbocharger or other turbomachine without departing from the scope of the present disclosure.

Figure 2:
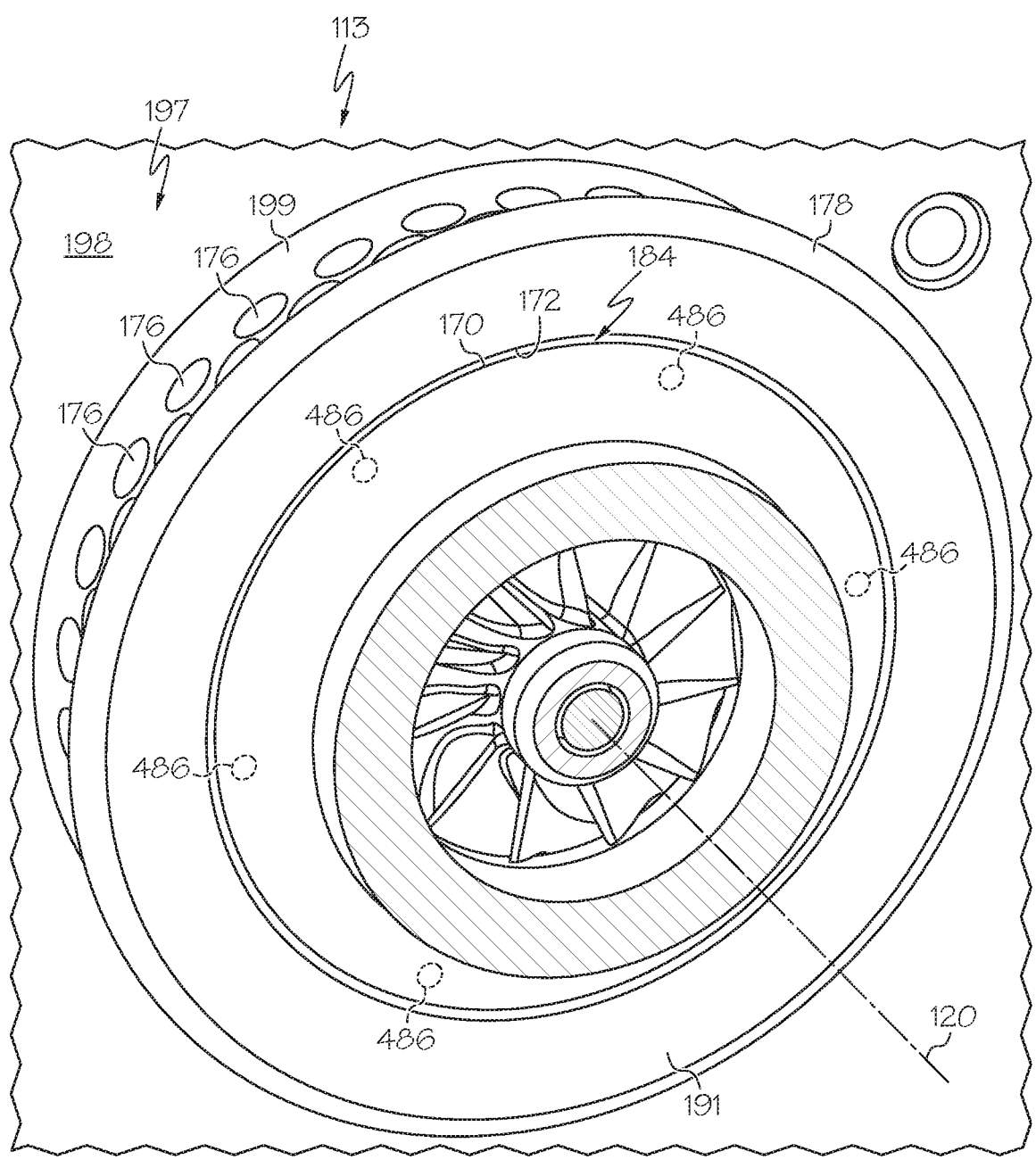
FIG. 2 is an isometric view of part of a turbine section of the turbomachine of FIG. 1.
Figure 3:
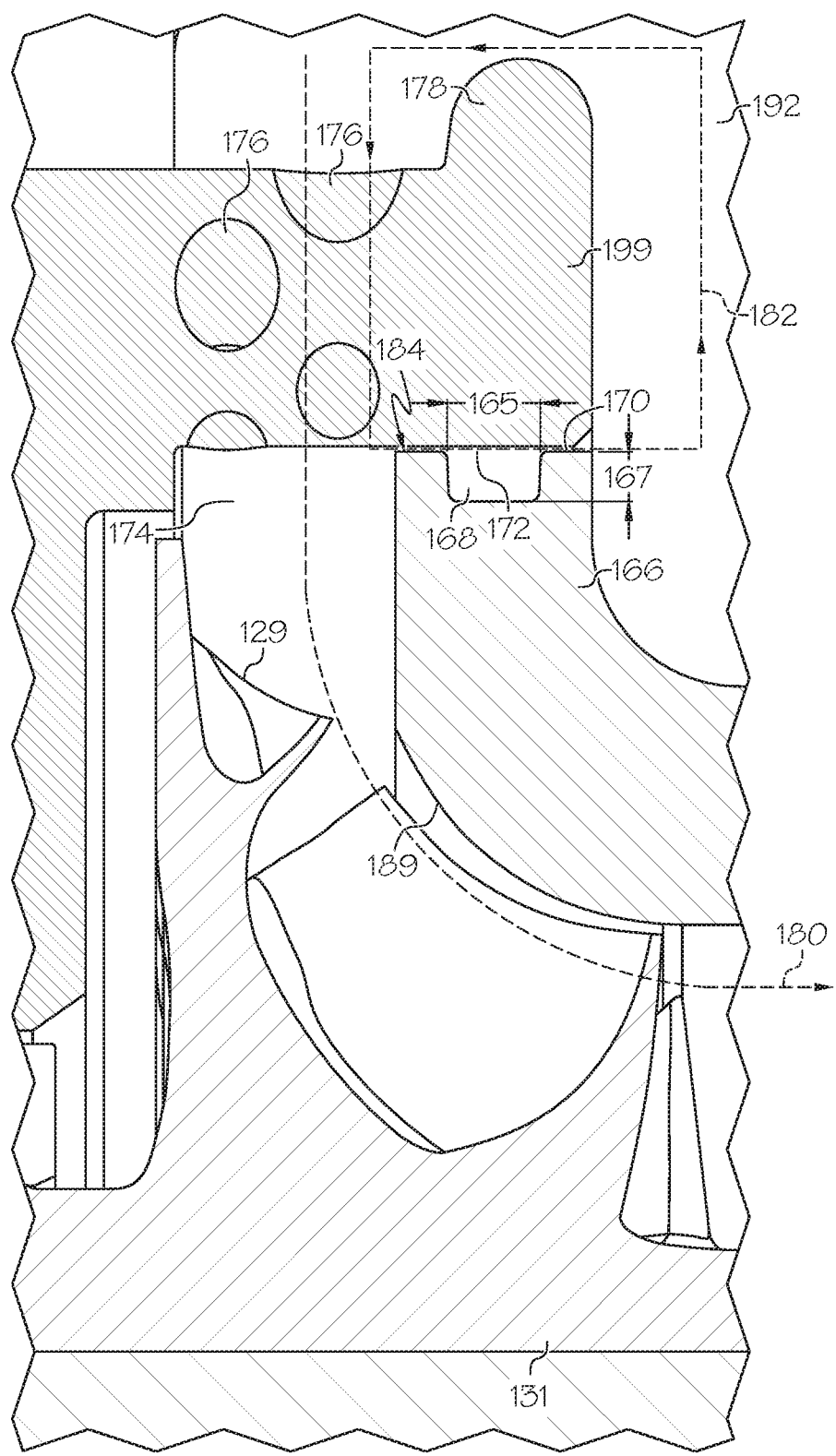
FIG. 3 is a cross-sectional view of the turbine section of FIG. 2 according to example embodiments.

Referring now to FIGS. 1-3, the housing 119 of the turbomachine 101 will be discussed in greater detail according to example embodiments. As schematically illustrated in FIG. 1, the housing 119 of the turbomachine 101 may include a compressor housing 152, a motor housing 150, and a turbine housing 188. The compressor housing 152 may define part of the compressor section 110, the motor housing 150 may define part of the motor section 112, and the turbine housing 188 may define part of the turbine section 113. These parts of the housing 119 may be assembled together as detailed below to collectively house and support the rotating group 118.

The compressor housing 152 may be a unitary, one-piece, arcuate part that is made of metal in some embodiments. The compressor housing 152 may define an inlet 153 extending along and centered on the axis 120. The compressor housing 152 may also include a convex compressor shroud surface 141 that is positioned in a downstream direction from the inlet 153. The compressor housing 152 also may include a volute passage 154 that extends about the axis 120. The compressor housing 152 may be fixed to one axial face of the motor housing 150 so as to cover over a front face of the compressor wheel 130 of the rotating group 118. The shroud surface 141 may oppose the compressor wheel 130 and may have inverse contour relative thereto. The inlet 153 may be fluidly connected to an exterior space (i.e., ambient) or may be fluidly connected to an upstream compressor device for receiving an airflow. The volute passage 154 may be fluidly connected to the intercooler 128 for providing the compressed airflow 124 thereto.

The motor housing 150 may include one or more parts that define a cavity for receiving and housing one or more parts of a motor 134 (e.g., an electric motor). In some embodiments, the motor housing 150 may house and support a motor stator member 138, whereas a motor rotor member 136 may be supported on the shaft 149 of the rotating group 118. As shown, the stator member 138 may surround the motor rotor member 136 circumferentially about the axis 120; however, in other embodiments, the rotor member 136 may surround the stator member 138.

The turbine housing 188 may include an outer turbine housing 195. The outer turbine housing 195 may be a unitary, one-piece arcuate part that is hollow and that is made of metal in some embodiments. The outer turbine housing 195 may include an outer radial portion 160 and an inner radial portion 162. The outer radial portion 160 and the inner radial portion 162 may be walls or other barrier structures that project axially from an axial end portion 164 of the outer turbine housing 195. The outer and inner radial portions 160, 162 may be spaced apart in the radial direction.

The inner radial portion 162 may be arcuate (e.g., annular), tubular, and hollow. The inner radial portion 162 may include an arcuate axial end 166. The end 166 may be contoured outward radially and may define a convex turbine shroud surface 189 thereon. The inner radial portion 162 may also define an outlet passage 194 that extends along and that is centered on the axis 120. As shown in FIG. 1, the outer turbine housing 195 may further include at least one bearing air line 196, which fluidly connects the bearing 121 to the outlet passage 194.

The outer radial portion 160 of the outer turbine housing 195 may be fixed to the axial face of the motor housing 150, on an axial side that is opposite the compressor housing 152. As such, the outer turbine housing 195 may cover over a front face of the turbine wheel 131 of the rotating group 118. The turbine shroud surface 189 may oppose the turbine wheel 131 and may have inverse contour relative thereto.

The turbine housing 188 may further include an inner turbine housing structure 197. The inner turbine housing structure 197 may be a unitary member made out of metal. The inner turbine housing structure 197 may include a back plate 198 and a nozzle structure 199. The back plate 198 may be relatively flat and may extend substantially perpendicular to the axis 120. The nozzle structure 199 may be arcuate so as to extend at least partly about the axis 120. In some embodiments, the nozzle structure 199 may be annular and ring-shaped (FIG. 2). The nozzle structure 199 may also be fixed to the back plate 198 and may project axially away therefrom and may terminate at an axial end 191. The nozzle structure 199 may include a plurality of nozzle apertures 176 that extend therethrough generally in the radial direction. In some embodiments, the nozzle apertures 176 may each be a rounded through-hole with an axis directed radially and substantially toward the turbine wheel 131. Also, as shown in FIG. 2, the nozzle apertures 176 may be disposed in an evenly spaced-apart arrangement about the axis 120. Furthermore, as shown in FIGS. 2 and 3, the axial end 191 of the nozzle structure 199 may include a dam 178. The dam 178 may be a rounded flange that projects radially outward and that extends continuously about the axis 120 in the circumferential direction.

The inner turbine housing structure 197 may be attached to the outer turbine housing 195 and the motor housing 150 as shown in FIGS. 1 and 3. The outer radial portion of the back plate 198 may be disposed axially between the outer turbine housing 195 and the motor housing 150. The shaft 149 may extend through the central portion of the back plate 198, and the nozzle structure 199 may encircle the turbine wheel 131. Also, the axial end 191 of the nozzle structure 199 may mate with the arcuate end 166 of the outer turbine housing 195. Those having ordinary skill in the art will appreciate that the term "mate" in this context is to be interpreted broadly. Opposing surfaces of the ends 191, 166 may be shaped in a corresponding manner and disposed closely adjacent to define a mating interface. These surfaces may or may not be physically connected to be considered mated together. In some embodiments, a sealing member may be included between these opposing surfaces, but such a sealing member may be omitted in some embodiments discussed in detail below. In some embodiments, the ends 191, 166 may establish a male-female interface wherein the arcuate end 166 is received within the axial end 191 of the nozzle structure 199. In some embodiments, an outer radial surface 170 of the arcuate end 166 may radially oppose an inner radial surface 172 of the axial end 191 of the nozzle structure 199. This interface will be discussed in greater detail below according to various embodiments of the present disclosure.

When assembled together, the outer turbine housing 195 and the inner turbine housing structure 197 may cooperatively define at least part of a circumferential inlet passage 192, which extends about the axis 120. The inlet passage 192 may be defined radially between the outer radial portion 160 and the inner radial portion 162 of the outer turbine housing 195 and between the outer radial portion 160 and the nozzle structure 199. The inlet passage 192 may defined axially between the back plate 198 and the axial end portion 164. As represented in FIG. 1, the passage 192 may be a toroidal passage with a cross sectional area that remains substantially constant as the passage 192 extends about the axis 120. In other embodiments, the passage 192 may be a volute passage in which the cross-sectional area gradually changes as it extends about the axis 120. The passage 192 may extend helically about the axis 120 in some embodiments as well.

Furthermore, the outer turbine housing 195, the inner turbine housing structure 197, and the turbine wheel 131 may cooperatively define a turbine wheel upstream area 174 (FIG. 3). The turbine wheel upstream area 174 may be defined radially between the nozzle structure 199 and an upstream portion 129 of the turbine wheel 131 (e.g., the leading edges of blades of the wheel 131). The turbine wheel upstream area 174 may be defined axially between the axial end 166 of the outer turbine housing 195 and the upstream portion 129 of the turbine wheel 131.

It will be appreciated that the nozzle structure 199 is an optional feature of the present disclosure. Thus, in these embodiments, the outer radial portion of the turbine wheel upstream area 174 may be open to the circumferential inlet passage 192 (i.e., unobstructed by the nozzle structure or other similar structure).

As shown in FIG. 1, the circumferential inlet passage 192 may be fluidly connected to the fuel cell stack 104 to receive the exhaust gas stream 132 therefrom. The turbine section 113 may define a first flow path (represented by arrow 180 in FIG. 1) for the exhaust gas stream 132. Specifically, fluid in the first flow path 180 may flow in a downstream direction from the inlet passage 192, through the nozzle apertures 176, into the turbine wheel upstream area 174, past the turbine wheel 131 and shroud surface 189, and into the outlet passage 194 to flow out of the turbomachine 101. This fluid flow may drive the turbine wheel 131 in rotation to provide mechanical power to the rotating group 118.

Overall, during operation of the turbomachine 101, an inlet airstream (represented by arrows 122 in FIG. 1) may flow into the inlet 153 of the compressor section 110, and the inlet airstream 122 may be compressed as it flows downstream between the compressor wheel 130 and the shroud surface 141 and further downstream into the volute passage 154. The compressed airstream 124 may exit the volute passage 154 and may be directed to the intercooler 128 and then to the fuel cell stack 104 for boosting the operating efficiency of the fuel cell system 100. Furthermore, as mentioned, the exhaust gas stream 132 from the fuel cell stack 104 may be directed back toward the turbomachine 101 and received by the passage 192 of the turbine section 113. The exhaust gas stream 132 may be directed generally toward the turbine wheel 131 to drive rotation of the turbine wheel 131 before exiting the turbomachine 101 via the outlet passage 194. Mechanical power from the turbine section 113 may be converted to electrical power for the motor 134 for ultimately assisting in rotation of the compressor wheel 130.

As shown, for example, in FIG. 3, the turbine section 113 may further include a recirculation flow path 182. The recirculation flow path 182 may extend from the circumferential inlet passage 192, through turbine wheel upstream area 174, and back to the circumferential inlet passage 192. Accordingly, fluid (e.g., liquid water that is airborne within the exhaust gas stream 132) may circulate through the flow path 182 without affecting rotation of the turbine wheel 131 as will be discussed.

The recirculation flow path 182 may be partly defined by one or more recirculation channels 184, which fluidly connect the turbine wheel upstream area 174 with the circumferential inlet passage 192. In some embodiments represented by FIGS. 2 and 3, the recirculation channel 184 may be defined at least partly by a radial gap between the outer radial surface 170 and the inner radial surface 172. Furthermore, in some embodiments, the recirculation channel 184 may be defined by one or more axial apertures 486 extending axially through the outer turbine housing 195. The axial apertures 486 are shown in phantom in FIG. 2 and will be discussed in greater detail below with reference to FIG. 6. It will be appreciated that the recirculation channel 184 may have other configurations without departing from the scope of the present disclosure. Furthermore, it will be appreciated that the recirculation channel 184 may include a combination of features (e.g., both the radial gap between the surfaces 170, 172 and the axial apertures 486) without departing from the scope of the present disclosure.

As stated, in the embodiment of FIG. 3, the recirculation channel 184 may be defined by the radial gap between the outer and inner radial surfaces 170, 172. This gap may extend continuously and annularly about the axis 120. Also, in some embodiments, at least one of the outer radial surface 170 and the inner radial surface 172 may include a recess that extends arcuately about the axis 120. For example, at least one of the surfaces 170, 172 may include an arcuate groove 168. In the illustrated embodiment, for example, the outer radial surface 170 includes the groove 168. The arcuate groove 168 may have a rectangular cross section as shown in FIG. 3 and may have a groove depth 167 (measured radially) and a groove width 165 (measured axially). The groove 168 may also be centered axially on the outer radial surface 170.

Thus, the exhaust gas stream 132 may include a combination of gas (air) and liquid (water), which is received within the circumferential inlet passage 192. This fluid combination may flow through the nozzle apertures 176 to be received within the turbine wheel upstream area 174. Pressure build-up within the turbine wheel upstream area 174 may cause the gaseous portion of the combination (the air) to continue along the first flow path 180 to the outlet passage 194 and may cause the liquid portion (the water) to move into the recirculation channel 184 along the recirculation flow path 182, thereby returning to the circumferential inlet passage 192.

The recirculation flow path 182 may increase the water ingestion capability of the turbomachine 101. Liquid recirculation provided by the flow path 182 may reduce the effect of the liquid on the rotation of the turbine wheel 131. For example, at least some liquid entering the turbine wheel upstream area 174 may recirculate one or more times within the recirculation flow path 182 instead of flowing directly past the turbine wheel 131. Stated differently, the recirculation flow path 182 may reduce the instantaneous liquid flow rate along the first flow path 180. As such, liquid in the first flow path 180 is less likely to apply a braking force to the turbine wheel 131 for reducing rotational speed, thereby providing high efficiency operation of the turbomachine 101. Also, surging rotation of the turbine wheel 131 is less likely because the load of the liquid on the wheel 131 may be reduced, may be more balanced, etc. Furthermore, loads on the bearing 121 may be reduced and the operating life of the turbomachine 101 may be extended.

Figure 4:
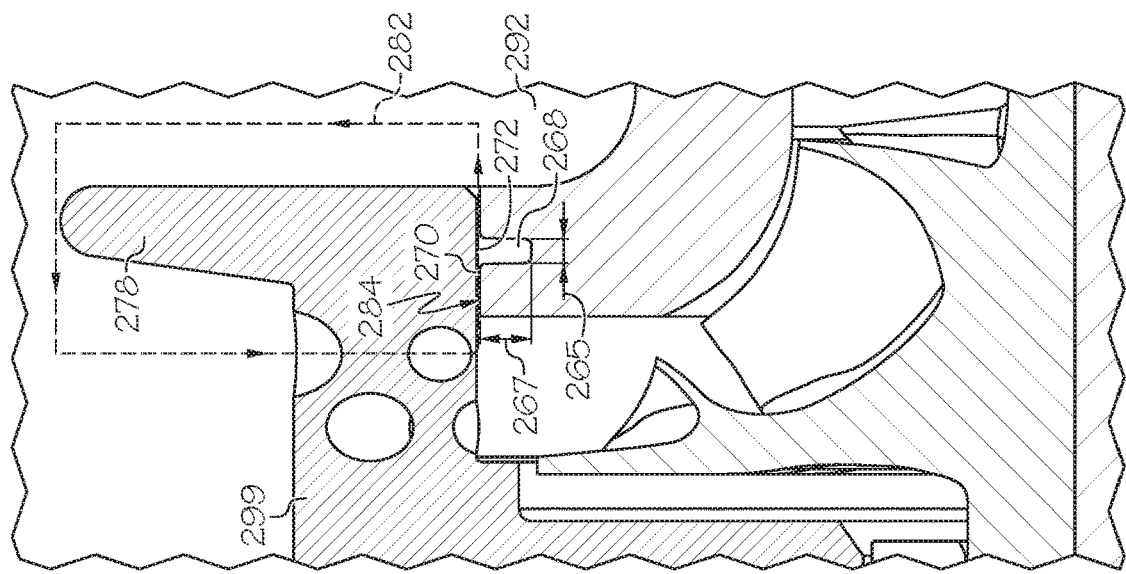
FIG. 4 is a cross-sectional view of the turbine section of FIG. 2 according to example embodiments.

FIG. 4 illustrates another embodiment and may be substantially similar to the embodiment of FIG. 3 except as noted. Components that correspond to those of FIG. 3 are indicated with corresponding reference numbers increased by 100. As shown, the channel 284 of the recirculation flow path 282 may be defined by the unsealed radial gap between the outer radial surface 270 and the inner radial surface 272. The groove 268 may be rectangular in cross-sectional shape, similar to the embodiment of FIG. 3, but the depth 267 of the groove 268 may be greater than that of FIG. 3, and the width 265 of the groove 268 may be smaller than that of FIG. 3. In addition, the dam 278 of the nozzle structure 299 may be larger than that of FIG. 3 such that the dam 278 projects radially outward to a greater dimension.

Figure 5:
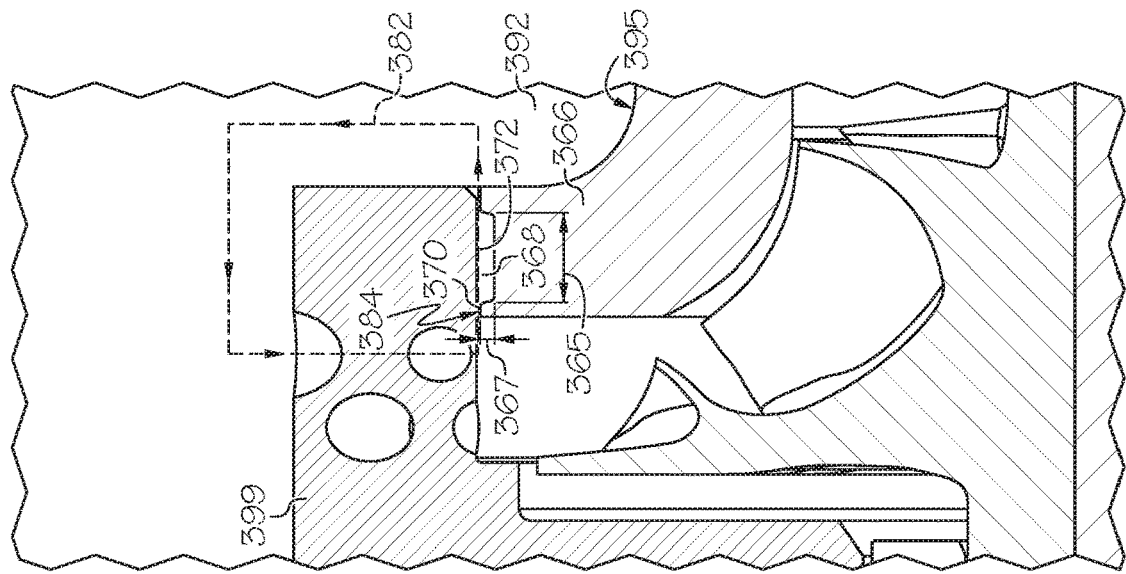
FIG. 5 is a cross-sectional view of the turbine section of FIG. 2 according to example embodiments.

FIG. 5 illustrates an additional embodiment, wherein components that correspond to those of FIG. 3 are indicated with corresponding reference numbers increased by 200. As shown, the channel 384 of the recirculation flow path 382 may be defined by the unsealed radial gap between the outer radial surface 370 and the inner radial surface 372. The groove 368 may be rectangular in cross-sectional shape, similar to the embodiment of FIG. 3, except that the depth 367 of the groove 368 may be less than that of FIG. 3, and the width 365 of the groove 368 may be greater than that of FIG. 3. Furthermore, as shown in FIG. 5, the nozzle structure 399 may be "dam-less" such that the nozzle structure 399 projects at a substantially constant diameter until it terminates proximate the axial end 366 of the outer turbine housing 395.

It will be appreciated that the dimensions (e.g., the depth and/or width) of the groove 168, 268, 368 may be predetermined, selected, and configured such that the recirculation channel 184, 284, 384 provides desired flow characteristics for the liquid to recirculate. Moreover, the size of the dam 178, 278 may be selected for providing desired flow characteristics from the inlet passage 192, 292, 392 toward the nozzle structure 199, 299, 399, or the dam can be omitted as represented in FIG. 5 to provide desired flow characteristics. It will also be appreciated that other dimensions and features of the channel 184, 284, 384 may be selected for providing the desired flow characteristics.

Figure 6:
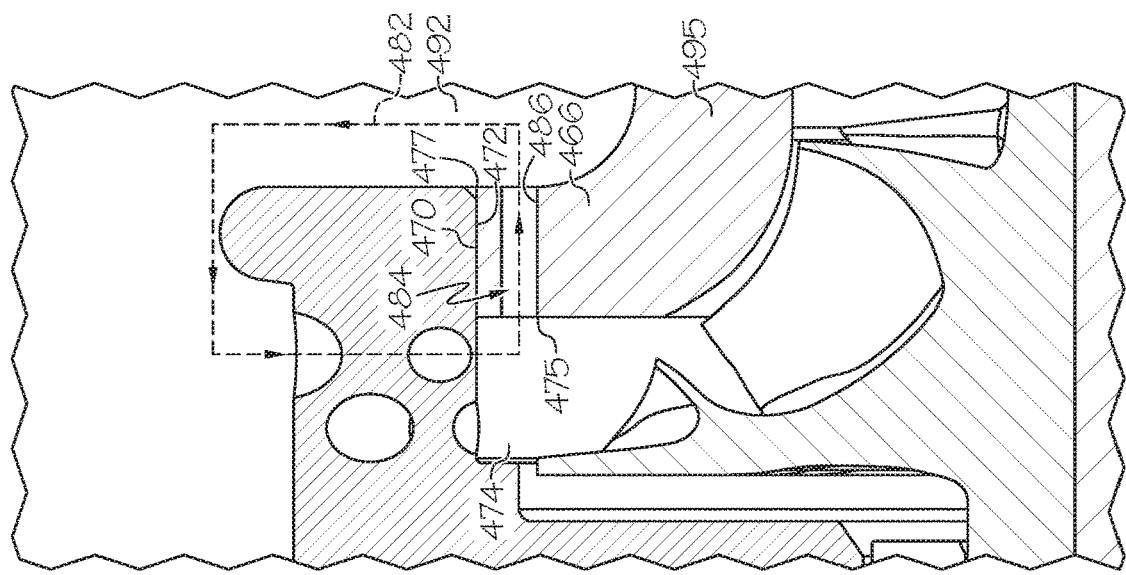
FIG. 6 is a cross-sectional view of the turbine section of FIG. 2 according to example embodiments.

Referring now to FIGS. 2 and 6, additional embodiments will be discussed. Components that correspond to those of FIG. 3 are indicated with corresponding reference numbers increased by 300. As shown, the channel 484 of the recirculation flow path 482 may be collectively defined by a plurality of axial apertures 486. At least one aperture 486 may be a circular through-hole that is axially straight and that extends through the axial end 466 of the outer turbine housing 495. At least one aperture 486 may extend substantially parallel to the longitudinal axis and may have a substantially constant width (diameter). There may be any number of axial apertures 486 (e.g., six in total), and the apertures 486 may be spaced approximately equally in the circumferential direction as shown in FIG. 2. In some embodiments, an upstream end 475 of the aperture 486 may be disposed upstream of the shroud surface 489 and upstream of the turbine wheel 431 and may be open to the turbine wheel upstream area 474. A downstream end 477 of the aperture 486 may be aligned axially with the upstream end 475 and may be open to the circumferential inlet passage 492. In some embodiments, the outer radial surface 470 and the inner radial surface 472 may be smooth and groove-less instead of including the annular grooves discussed above and shown in FIGS. 4 and 5. As such, the apertures 486 may primarily define the recirculation flow channel 484; however, in other embodiments, the apertures 486 and the gap between the radial surfaces 470, 472 may collectively define the recirculation flow channel 484.

In summary, the turbomachine 101 of the present disclosure may include a number of configurations of the recirculation flow path 182, 282, 382, 482. The flow path 182, 282, 382, 482 increases the capability of the turbomachine 101 to ingest water or other fluids.

The turbomachine 101 can also be manufactured efficiently. In particular, the housing 119 at the turbine section 113 can be attached together with relatively few steps and may have a relatively low part count. In some embodiments of manufacture, the back plate 198 of the inner turbine housing structure 197 may be layered on the motor housing 150 with one or more seals therebetween. The turbine wheel 131 may also be disposed within the nozzle structure 199. Then, the outer turbine housing 195 may be attached to the back plate 198 and/or the motor housing 150 with one or more fasteners with the end 166 received within the nozzle structure 199. As such, the features of the turbine stage 113, including the recirculation flow path 182, 282, 382, 482 may be provided.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A turbine section of a turbomachine comprising:
a rotating group with a turbine wheel;
a housing that houses and supports the rotating group for rotation about an axis, the housing defining a circumferential inlet passage that extends about the axis, the housing defining a turbine wheel upstream area that is disposed downstream of the circumferential inlet passage and upstream of the turbine wheel, the housing defining an outlet that is downstream of the turbine wheel;
a first flow path that extends from the circumferential inlet passage, through the turbine wheel upstream area, across the turbine wheel, to the outlet; and
a recirculation flow path that extends from the circumferential inlet passage, through the turbine wheel upstream area, and back to the circumferential inlet passage.

2. The turbine section of claim 1, wherein the housing includes a nozzle structure with a nozzle aperture, the nozzle structure at least partly defining the turbine wheel upstream area.

3. The turbine section of claim 2, wherein the nozzle structure is arcuate and extends at least partly about the axis, the nozzle structure including a plurality of nozzle apertures that are spaced apart at a distance.

4. The turbine section of claim 3, wherein the housing includes a turbine housing member with an arcuate end that mates with the nozzle structure;
the turbine housing member and the nozzle structure cooperatively defining at least part of the circumferential inlet passage; and
the turbine housing member, the nozzle structure, and the turbine wheel cooperatively defining at least part of the turbine wheel upstream area.

5. The turbine section of claim 4, wherein the turbine housing member includes a turbine shroud surface that opposes the turbine wheel.

6. The turbine section of claim 4, wherein one of the arcuate end and the nozzle structure receives the other of the arcuate end and the nozzle structure.

7. The turbine section of claim 6, wherein the arcuate end includes an outer radial surface, wherein the nozzle structure includes an inner radial surface; and
wherein the recirculation flow path is defined by a gap between the outer radial surface and the inner radial surface.

8. The turbine section of claim 7, wherein at least one of the outer radial surface and the inner radial surface includes a recess that extends arcuately about the axis.

9. The turbine section of claim 8, wherein the recess is an arcuate groove that has a substantially rectangular cross-section.

10. The turbine section of claim 4, wherein the recirculation flow path is at least partly defined by an axial aperture extending axially through one of the turbine housing member and the nozzle structure.

11. The turbine section of claim 10, wherein the axial aperture extends axially through the turbine housing member.

12. The turbine section of claim 10, wherein the axial aperture is an axially straight through-hole extending through the one of the turbine housing member and the nozzle structure.

13. The turbine section of claim 10, wherein the axial aperture is one of a plurality of axial apertures extending axially through the one of the turbine housing member and the nozzle structure, the plurality of axial apertures spaced apart about the axis.

14. The turbine section of claim 10, wherein the axial aperture extends substantially parallel to the axis.

15. The turbine section of claim 4, wherein the nozzle structure includes an axial end that includes a dam that projects radially outward and arcuately about the axis, the dam disposed within the first flow path and the recirculation flow path.

16. The turbine section of claim 1, wherein the circumferential inlet passage is a toroidal circumferential inlet passage with a cross sectional area that remains substantially constant as the circumferential inlet passage extends about the axis.

17. A method of manufacturing a turbine section of a turbomachine comprising:
housing a turbine wheel of a rotating group within a housing and supporting the rotating group within the housing for rotation about an axis;
mating a first structure of the housing with a second structure of the housing member, the housing defining a circumferential inlet passage that extends about the axis, defining a turbine wheel upstream area that is disposed downstream of the circumferential inlet passage and upstream of the turbine wheel, defining a first flow path, defining a recirculation flow path, and defining an outlet that is downstream of the turbine wheel;
the first flow path extending from the circumferential inlet passage, through the turbine wheel upstream area, across the turbine wheel, to the outlet; and
the recirculation flow path extending from the circumferential inlet passage, through the turbine wheel upstream area, and back to the circumferential inlet passage.

18. The method of claim 17, wherein mating the first structure with the second structure includes mating an outer radial surface of the first structure with an inner radial surface of the second structure; and wherein the recirculation flow path is defined by a gap between the outer radial surface and the inner radial surface.

19. The method of claim 17, wherein mating the first structure with the second structure includes mating an arcuate end of a turbine housing member with an arcuate nozzle structure, and wherein the recirculation flow path is at least partly defined by an axial aperture extending axially through one of the turbine housing member and the nozzle structure.

20. A compressor device for a fuel cell system comprising:
a rotating group;
a housing that houses and supports the rotating group for rotation about an axis to define a compressor section, a motor section, and a turbine section, the turbine section including a turbine wheel of the rotating group, the turbine wheel configured to be driven in rotation by an exhaust stream from the fuel cell system, the housing at the turbine section including a circumferential inlet passage that extends about the axis, the housing at the turbine section defining a turbine wheel upstream area that is disposed downstream of the circumferential inlet passage and upstream of the turbine wheel, the housing at the turbine section defining an outlet that is downstream of the turbine wheel;
a first flow path that extends from the circumferential inlet passage, through the turbine wheel upstream area, across the turbine wheel, to the outlet; and
a recirculation flow path that extends from the circumferential inlet passage, through the turbine wheel upstream area, and back to the circumferential inlet passage.

* * * * *